(12) United States Patent
Li (10) Patent No.: US 10,616,488 B2
(45) Date of Patent: Apr. 7, 2020

(54) IMAGE DISPLAY METHOD, VEHICLE DISPLAY DEVICE, VEHICLE SUN VISOR, AND RELATED VEHICLE

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 483 days.

(21) Appl. No.: 15/534,439

(22) PCT Filed: Dec. 29, 2016

(86) PCT No.: PCT/CN2016/112842
§ 371 (c)(1),
(2) Date: Jun. 8, 2017

(87) PCT Pub. No.: WO2017/177716
PCT Pub. Date: Oct. 19, 2017

(65) Prior Publication Data
US 2018/0198981 A1    Jul. 12, 2018

(30) Foreign Application Priority Data
Apr. 14, 2016  (CN) .......................... 2016 1 0230521

(51) Int. Cl.
*H04N 5/232* (2006.01)
*B60R 1/00* (2006.01)
(Continued)

(52) U.S. Cl.
CPC ........ *H04N 5/23293* (2013.01); *B60J 3/0204* (2013.01); *B60R 1/00* (2013.01);
(Continued)

(58) Field of Classification Search
CPC ............ H04N 5/23293; H04N 5/2253; H04N 5/44591; B60R 1/00; B60R 11/0235;
(Continued)

(56) References Cited

U.S. PATENT DOCUMENTS 6,281,804 B1 * 8/2001 Haller ....................... B60R 1/00
340/901
9,774,790 B1 * 9/2017 Kussel ..................... B60R 1/00
(Continued)

FOREIGN PATENT DOCUMENTS

CN    102163331 A    8/2011
CN    203331791 U    12/2013
(Continued)

OTHER PUBLICATIONS

The World Intellectual Property Organization (WIPO) International Search Report for PCT/CN2016/112842 dated Apr. 1, 2017.
(Continued)

*Primary Examiner* — Oschta I Montoya
(74) *Attorney, Agent, or Firm* — Anova Law Group, PLLC (57) ABSTRACT

The present disclosure provides a vehicle display device, configured to be mounted on a sun visor frame, including: a controller for receiving surrounding images, labeling a reference object in the surrounding images, and determining a first image to be displayed from the surrounding images according to a comparison of the reference object and a real object corresponding to the reference object; a non-transparent display screen for displaying the first image in a driver's sightline, wherein the non-transparent display screen is connected to the controller; and a plurality of image acquisition modules including a front camera, two side view (Continued)

cameras, and a rear view camera for capturing front images, left-side images, right-side images, and rear images of a vehicle.

19 Claims, 5 Drawing Sheets

(51) Int. Cl.
- *B60R 11/02* (2006.01)
- *B60J 3/02* (2006.01)
- *H04N 5/225* (2006.01)
- *H04N 5/445* (2011.01)
- *H04N 7/18* (2006.01)
- *B60R 11/00* (2006.01)
- *G06T 7/70* (2017.01)

(52) U.S. Cl.
CPC ....... *B60R 11/0235* (2013.01); *H04N 5/2253* (2013.01); *H04N 5/44591* (2013.01); *H04N 7/181* (2013.01); *B60R 2011/0035* (2013.01); *B60R 2300/105* (2013.01); *B60R 2300/202* (2013.01); *B60R 2300/30* (2013.01); *B60R 2300/70* (2013.01); *B60R 2300/8053* (2013.01); *G06T 7/70* (2017.01)

(58) Field of Classification Search
CPC .......... B60R 2300/202; B60R 2300/70; B60R 2300/8053; B60R 2300/105; B60R 2300/30

See application file for complete search history.

(56) References Cited

U.S. PATENT DOCUMENTS

| | | | | |
|---|---|---|---|---|
| 2011/0221793 | A1* | 9/2011 | King, III | G02B 27/017 345/690 |
| 2013/0054086 | A1* | 2/2013 | Lo | B60R 1/00 701/36 |
| 2013/0314503 | A1* | 11/2013 | Nix | G06K 9/00805 348/46 |
| 2015/0060649 | A1* | 3/2015 | Pilgrim | B60J 1/208 250/214 AL |
| 2017/0088053 | A1* | 3/2017 | Orellana | B60Q 9/008 |
| 2018/0334099 | A1* | 11/2018 | Gao | B60R 1/00 |

FOREIGN PATENT DOCUMENTS

| | | |
|---|---|---|
| CN | 105128634 A | 12/2015 |
| WO | 9621581 A1 | 7/1996 |

OTHER PUBLICATIONS

The State Intellectual Property Office of the People's Republic of China (SIPO) Office Action 1 for 201610230521.5 dated Nov. 11, 2016.

* cited by examiner

FIG. 1

*Related Art*

IMAGE DISPLAY METHOD, VEHICLE DISPLAY DEVICE, VEHICLE SUN VISOR, AND RELATED VEHICLE

CROSS-REFERENCE TO RELATED APPLICATION

This application is a national phase entry under 35 U.S.C. § 371 of International Application No. PCT/CN2016/112842, filed on Dec. 29, 2016, which claims priority to Chinese Patent Application No. 201610230521.5, filed on Apr. 14, 2016, the entire contents of both of which are incorporated by reference herein.

TECHNICAL FIELD

The present invention relates to display technology, more particularly, to an image display method, a vehicle display device, a sun visor, and a related vehicle.

BACKGROUND

Figure 1:
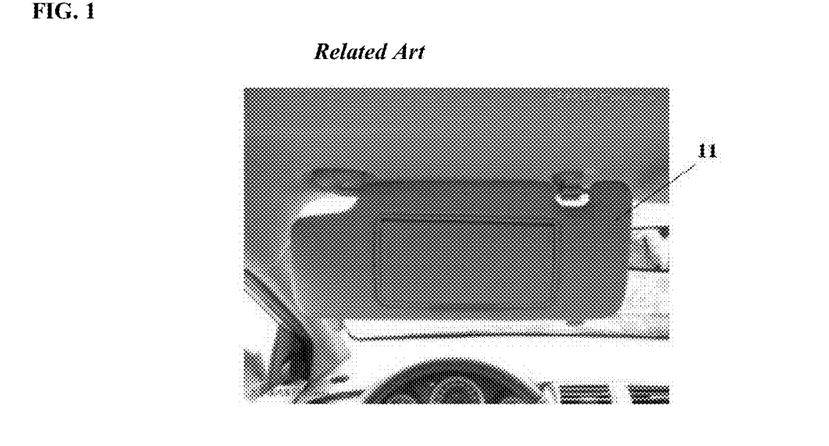
FIG. 1 is a diagram illustrating a conventional sun visor.

FIG. 1 illustrates an existing sun visor 11. During a driving operation, when there is continuous direct sunlight, often a sun visor would be used to shield the light; however, when the visor shields the light, it also blocks a portion of the view of the driver. This may impair the safety of the driver and increase the risk to have accidents.

SUMMARY

One aspect of the disclosure provides a vehicle display device, configured to configured to be mounted on a sun visor frame, including: a controller for receiving surrounding images, labeling a reference object in the surrounding images, and determining a first image to be displayed from the surrounding images according to a comparison of the reference object and a real object corresponding to the reference object; a non-transparent display screen for displaying the first image in a driver's sightline, wherein the non-transparent display screen is connected to the controller.

Optionally, the vehicle display device further includes: an enhancement module connected to the controller, wherein the enhancement module is configured to adjust the surrounding images based on an enhancement algorithm to obtain adjusted surrounding images.

Optionally, the controller includes: an image selection unit configured to obtain a second image containing the reference object from the surrounding images; an image comparison unit configured to compare the physical spaces between the reference object and a real object corresponding to the reference object; and an image determination unit configured to identify the second image as the first image to be displayed when the physical spaces between the reference object and the real object corresponding to the reference object are compatible.

Optionally, the vehicle display device further includes: an image acquisition module connected to the controller, wherein the image acquisition module is configured to acquire the surrounding images of the vehicle.

Optionally, the vehicle display device further includes: a holder installed inside a vehicle cabin, wherein the non-transparent display screen is supported by the holder.

Optionally, the controller is connected to an electric control unit (ECU).

Optionally, the controller is connected to a vehicle entertainment unit.

Optionally, the image acquisition module includes one or a plurality of cameras, and the camera or the plurality of cameras are installed outside the vehicle.

Optionally, the image acquisition module includes one or a plurality of cameras, and the camera or the plurality of cameras are installed on the holder.

Optionally, a shooting direction of one of the plurality of cameras is the same as a driving direction of the vehicle.

Optionally, the vehicle display device further includes: a photo-sensitive sensor connected to the controller, wherein the photo-sensitive sensor is configured to detect an ambient light intensity, and the controller adjusts a display brightness of the non-transparent display screen based on the ambient light intensity.

Optionally, the vehicle display device further includes: a solar charging module connected to the controller.

Optionally, the non-transparent display screen is frameless.

Another aspect of the present disclosure provides an image display method for displaying an image of a surrounding environment of a vehicle, including: acquiring surrounding images of a vehicle; labeling a reference object in the surrounding images; determining a first image to be displayed based on the surrounding images according to a comparison of the labeled reference object and a corresponding real object; and displaying the first image in real-time on a non-transparent display screen in a driver's sightline.

Optionally, the method according to claim 14, further includes: adjusting the surrounding images based on an enhancement algorithm; and obtaining adjusted surrounding images.

Optionally, the method further includes: acquiring the surrounding images of the vehicle; and labeling the reference object in the surrounding images based on a driving direction of the vehicle.

Optionally, the method further includes: acquiring a second image containing the reference object from the surrounding images; comparing physical spaces of the reference object in the second image and the corresponding real object in the second image; and defining the second image as the first image to be displayed when the physical spaces of the reference object and the real object corresponding to the reference object are compatible.

Optionally, the method further includes: detecting an ambient light intensity; and adjusting a display brightness of the non-transparent display screen according to the ambient light intensity.

Optionally, the method further includes: receiving and displaying a warning message on the non-transparent display screen together with the first image.

Optionally, the method further includes: acquiring and displaying a surrounding image reflecting a right-side view from the vehicle on the non-transparent display screen together with the first image; a surrounding image reflecting a left-side view from the vehicle on the non-transparent display screen together with the first image; and a surrounding image reflecting a rear view from the vehicle on the non-transparent display screen together with the first image.

Optionally, the method further includes: acquiring the surrounding images of the vehicle via one or a plurality of cameras, wherein the camera or the plurality of cameras are installed inside the vehicle cabin, or the camera or the plurality of cameras are installed outside the vehicle body.

Optionally, the method further includes: displaying the first image and other surrounding images in real-time in the non-transparent display screen in a driver's sightline.

Another aspect of the present disclosure provides a vehicle sun visor, including a sun visor frame, a disclosed vehicle display device, the non-transparent display screen of the vehicle display device being installed on the sun visor.

Another aspect of the present disclosure provides a vehicle, including one or more of the disclosed vehicle display devices.

Another aspect of the present disclosure provides a vehicle, including the disclosed vehicle sun visor.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Often, a sun visor is used to shield light when there is continuous direct sunlight through the windshield of a vehicle. However, the view of a driver may be partially blocked at the same time when the sun visor is pulled down, thus impairing the driving safety of the driver. Further, when the weather is windy, rainy, snowy or foggy, the view of the driver may also be affected by the weather, which may cause great distress to the driver.

The present disclosure provides an image display method, a vehicle display device, a sun visor and a related vehicle. The disclosed image display method may obtain a plurality of surrounding images of a vehicle and label a reference object in the surrounding images. The image display method may then determine a first image to be displayed among the plurality of surrounding images according to the reference object and a real object corresponding to the reference object. Further, the image display method may display the first image in real time on a non-transparent display screen in the driver sightline. Via the first image displayed on the display screen, the driver may learn related information of the vehicle surroundings, and may alleviate the driving safety issue when the driver's view is blocked by a sun visor.

Figure 2:
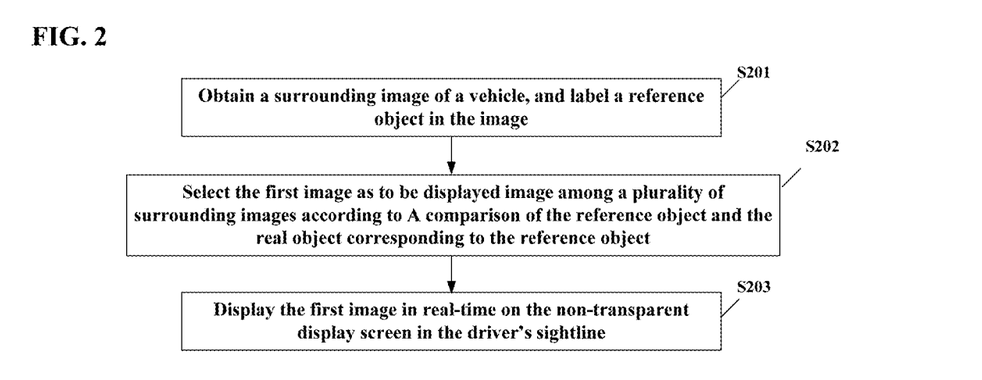
FIG. 2 is a diagram illustrating an exemplary image display method according to disclosed embodiments.

FIG. 2 is a diagram illustrating an image display method in some embodiments of the present disclosure. As shown in FIG. 2, the image display system may obtain a surrounding image of a vehicle and label a reference object in the image (S201). To ensure the driving safety of a driver, the surrounding image may show one or more traffic lanes along the driving direction of the vehicle. For example, the surrounding image may show a current traffic lane the vehicle drives on, or may show the current traffic lane the vehicle drives on and a lane next to the current traffic lane. In the present disclosure, the form of the surrounding image is for illustrative purposes only, and is not intended to limit the scope of the present disclosure.

The reference object may be an object around the vehicle in the surrounding image, for example, the reference object may be another vehicle near the current vehicle in the surrounding image, or may be a building near the current vehicle in the surrounding image, or a pedestrian near the current vehicle in the surrounding image. The type of the reference object is for illustrative purposes only, and is not intended to limit the scope of the present disclosure.

Optionally, in step S201, the image display system may obtain the surrounding image of a vehicle via an image acquisition module 63. Based on the driving direction of the vehicle, the reference object may be labeled in the surrounding image. For example, the surrounding image of a vehicle may be obtained via one or a plurality of cameras. The camera or the plurality of cameras may be installed on a holder inside the vehicle cabin, or may be installed outside on the vehicle body.

The disclosed image acquisition module may be a camera installed on the vehicle. For example, the image acquisition module may be a camera (i.e., a high-definition camera) installed on a luggage rack, or a camera installed on a rear-view mirror, or a camera installed on a front bumper of the vehicle. Optionally, the image acquisition module 63 may also be a camera in a smart phone. The camera in the smart phone may be used to take surrounding images of the vehicle, and the surrounding images of the vehicle may be delivered to a vehicle display device by wired or wireless transmission. The types of the image acquisition module 63 is for illustrative purposes only, and is not intended to limit the scope of the present disclosure.

Figure 3:
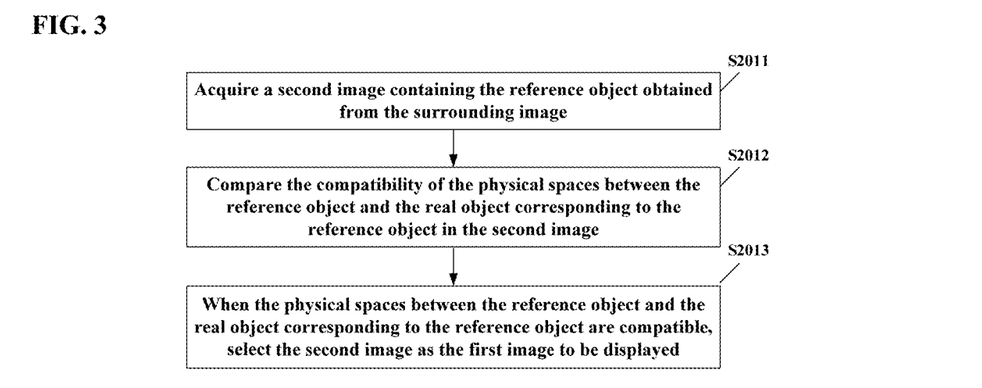
FIG. 3 is a diagram illustrating an exemplary step S202 according to disclosed embodiments.

In one embodiment, the surrounding image obtained in step S201 may need to be adjusted to avoid conflict between the image displayed on the display screen and an image acquired by naked eyes of the driver, thus ensuring a compatibility between the image displayed on the display screen and a surrounding environment. Optionally, as shown in FIG. 3, step S201 may include steps S2011~S2013. In particular, in step S2011, the image display system may acquire a second image containing the reference object obtained from the surrounding image. In step S2012, the system may compare the actual physical distance/spaces of the reference object and the reference object in the second image by recognizing traffic signs along the road. The traffic signs may, for example, be road signs or solid lines that have a standard scale for comparison of the physical spaces. When the physical spaces between the reference object and the real object corresponding to the reference object are compatible, step S2013 may be executed. In Step S2013, the system may determine the second image as the first image to be displayed.

The image display system may determine the first image to be displayed among a plurality of surrounding images according to the reference object and the real object corresponding to the reference object (S202).

In step S203, the image display system may display the first image in real-time on a non-transparent display screen 64 in the driver's sightline.

The non-transparent display screen 64 may be a Liquid Crystal Display (LCD) screen, an Organic Light-emitting Diode display (OLED) screen, an Electrochromic display (ECD) screen, a Polymer-dispersed liquid crystal (PDLC) screen, an E-paper, or other display devices. The non-transparent display screen 64 may be installed inside the vehicle cabin via a holder. Optionally, the non-transparent display screen 64 may be installed on the holder of a sun visor as a part of the sub visor. The mounting method of the non-transparent display screen 64 is for illustrative purposes only, and is not intended to limit the scope of the present disclosure.

Optionally, display brightness of the display screen may be adjusted by the driver based on ambient light intensity to avoid too strong or too weak brightness levels that influence the viewing effect of the first image acquired by the driver. Specifically, before step S201, the image display system may also collect the ambient light intensity, and automatically adjust the display brightness of the display screen based on the ambient light intensity. The display brightness of the display screen may also be adjusted before step S202 or step S203. A specific order of the step that adjusts the display brightness of the display screen is for illustrative purposes only, and is not intend to limit the scope of the present disclosure.

In this embodiment, the reference object may be labeled in the collected surrounding image of the vehicle. The first image to be displayed may be determined from a plurality of surrounding images according to the reference object and the real object corresponding to the reference object. The first image may be displayed on the non-transparent display screen 64 in the driver's sightline. The compatibility between display content and the surrounding environment may be ensured via checking the labeled reference object, and the driver may obtain related information of the vehicle surroundings via the first image displayed on the display screen, thus improving driver's forward looking view and driving safety.

Figure 4:
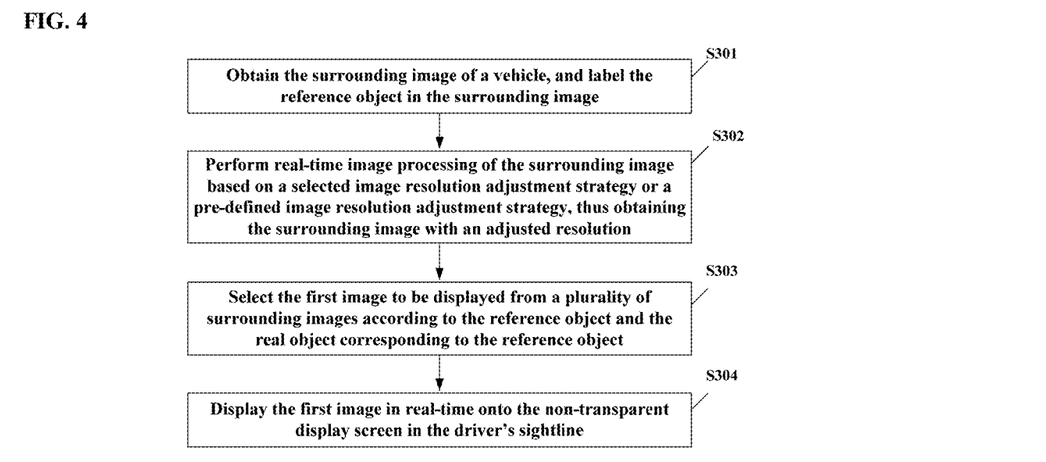
FIG. 4 is a diagram illustrating another exemplary image display method according to disclosed embodiments.

In another embodiment, FIG. 4 illustrates another exemplary image display system. As shown in FIG. 4, the image display system may execute step S301 to obtain the surrounding image of a vehicle, and label the reference object in the surrounding image.

Optionally, the surrounding image of the vehicle may be obtained via one or a plurality of image acquisition modules. According to the driving direction of the vehicle, the reference object may be labeled in the surrounding image. The image acquisition module may be a camera installed on the vehicle, for example, a camera (e.g., a HD camera) installed on a front bumper of the vehicle. Optionally, the image acquisition module may be a camera in a smart-phone. The camera in the smart phone may be used to take surrounding images of the vehicle, and the surrounding images of the vehicle may be delivered to the vehicle display device by wired or wireless transmission. The type of the image acquisition module is for illustrative purposes only, and is not intended to limit the scope of the present disclosure.

In Step S302, the system may perform real-time image processing of the surrounding image based on an enhancement algorithm, thus obtaining the adjusted surrounding images.

A user may select the adjustment algorithm of image resolution, and may input a control command into the vehicle display device via an input module. Different control commands may correspond to different image resolution processing modes, including an image resolution processing mode for a foggy day, an image resolution processing mode for a rainy day, an image resolution processing mode for a snowy day, and an image resolution processing mode for glare control, etc.

In step S302, the existing image resolution adjustment algorithm may be used to adjust the surrounding image. The existing image resolution adjustment algorithm may include but not limited to algorithms that adjust image color, image sharpness, image contrast, and image brightness. Other methods may also be used for image adjustment. For example, the surrounding image collected in step S301 may be compared to a standard image, and the resolution of the surrounding image may be adjusted according to the standard image. The standard image may be a rainy day image, a foggy day image, etc. The disclosed adjustment algorithm of image resolution is for illustrative purposes only, and is not intended to limit the scope of the present disclosure.

The image display method may include step S303. In step S303, the first image to be displayed may be determined from a plurality of surrounding images according to the reference object and the real object corresponding to the reference object.

The surrounding image with an adjusted resolution in step S302 may be further adjusted to avoid conflict between the image displayed on the display screen and the image acquired by the naked eyes of the driver, thus ensuring the compatibility between the image displayed on the display screen and the surrounding environments. Optionally, in step S303, the system may acquire a second image containing the reference object obtained from the surrounding image. The compatibility of the physical spaces between the reference object and the real object corresponding to the reference object in the second image may be compared. When the physical spaces between the reference object and the real object corresponding to the reference object are compatible, the second image may be determined as the first image to be displayed.

The image display method may include step S304. In Step S304, the system may display the first image in real-time onto the non-transparent display screen 64 in the driver's sightline. The non-transparent display screen 64 may be LCD, OLED, ECD, PDLC, E-paper, or other display device. The non-transparent display screen 64 may be installed inside the vehicle cabin via a holder. Optionally, the non-transparent display screen 64 may be installed on the holder of a sun visor. The mounting method of the non-transparent display screen 64 is for illustrative purposes only, and is not intended to limit the scope of the present disclosure.

Optionally, the display brightness level of the display screen may be automatically adjusted based on the ambient light intensity to avoid too strong or too weak brightness levels that influence the viewing effect of the first image acquired by the driver. Specifically, before step S301, the image display method may also collect the ambient light intensity, and automatically adjust the display brightness of the display screen based on the ambient light intensity. The display brightness of the display screen may also be adjusted before step S302, step S303, or step S304. The specific order of the step that adjusts the display brightness of the display screen is for illustrative purposes only, and is not intend to limit the scope of the present disclosure.

In this embodiment, the reference object may be labeled in the collected surrounding image of the vehicle. The first image to be displayed may be determined from a plurality of surrounding images according to the reference object and the real object corresponding to the reference object. The first image may be displayed on the non-transparent display screen 64 in the driver's sightline. The compatibility between the display content and the surrounding environment may be ensured via the labeled reference object, and the driver may obtain related information of the vehicle surroundings via the first image displayed on the display screen, thus alleviating the driving safety issue when the driver's view is blocked.

Figure 5A:
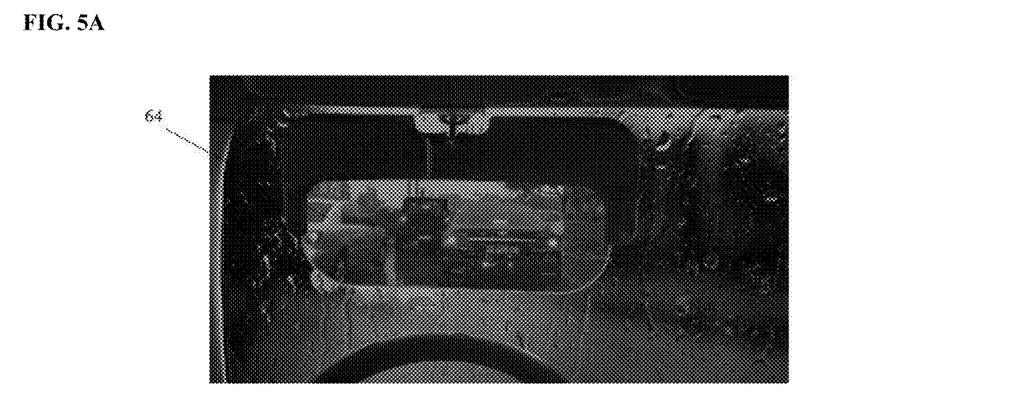
FIGS. 5A-5D are diagrams illustrating a first image under different weathers on a display screen according to disclosed embodiments.
Figure 5B:
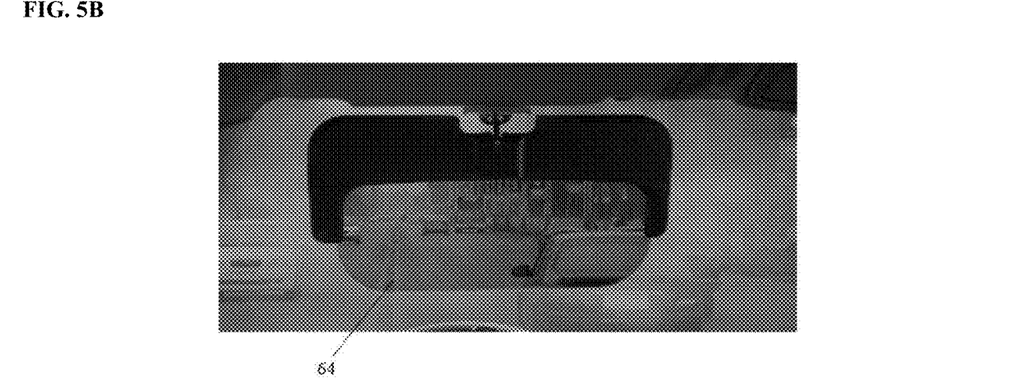
Figure 5C:
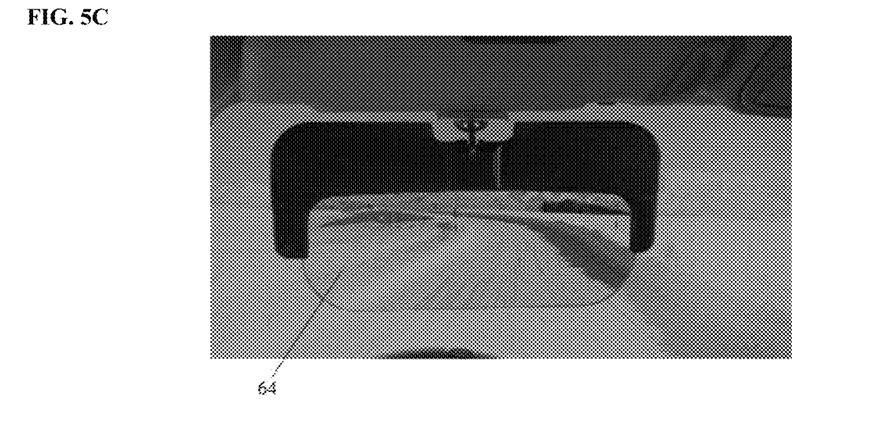
Figure 5D:
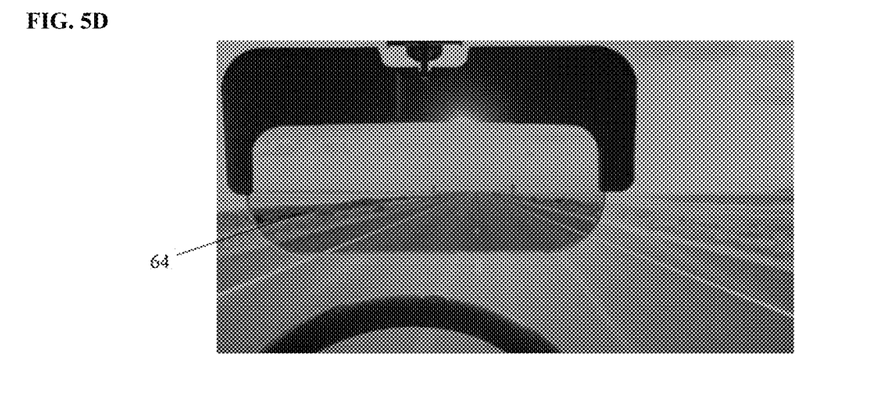

Further, for the issue that the driver's view is impaired due to the weather, the resolution of the collected surrounding image of the vehicle may be adjusted. Accordingly, even under conditions of windy and rainy, snowy, or foggy, the driver may still see clear images through the display screen, thus avoiding the blocked view of the driver caused by the weather to further improve the driving safety. FIG. 5A is a diagram illustrating the first image displayed on the non-transparent display screen 64 on a rainy day. FIG. 5B is a diagram illustrating the first image displayed on the non-transparent display screen 64 on a foggy day. FIG. 5C is a diagram illustrating the first image displayed on the non-transparent display screen 64 on a snowy day. FIG. 5D is a diagram illustrating the first image displayed on the non-transparent display screen 64 under strong sunlight.

For example, in one embodiment, the vehicle display device may determine it is a rainy day based on the reading of ambient light. When the sun visor is pulled down, the system may acquire the surrounding image of the vehicle. Based on the rainy day light reading, the vehicle display device may increase the contrast, brightness, or resolution, of the image to be displayed on the non-transparent display screen 64. In another example, if the vehicle display device may obtain the ambient light intensity and determine it is a bright sunny day. The vehicle display device may the decrease the contrast or brightness of the image to be displayed on the non-transparent display screen 64.

Figure 6:
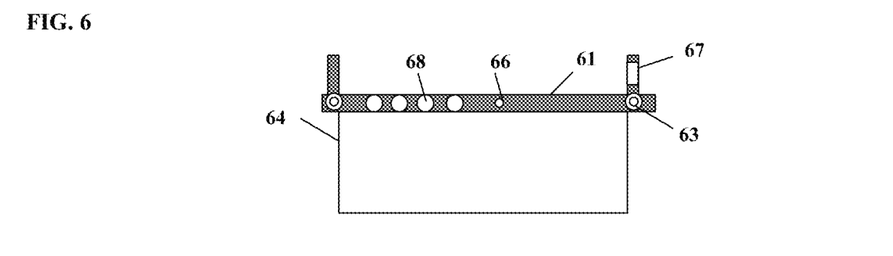
FIG. 6 is a diagram illustrating an exemplary vehicle display device according to disclosed embodiments.
Figure 7:
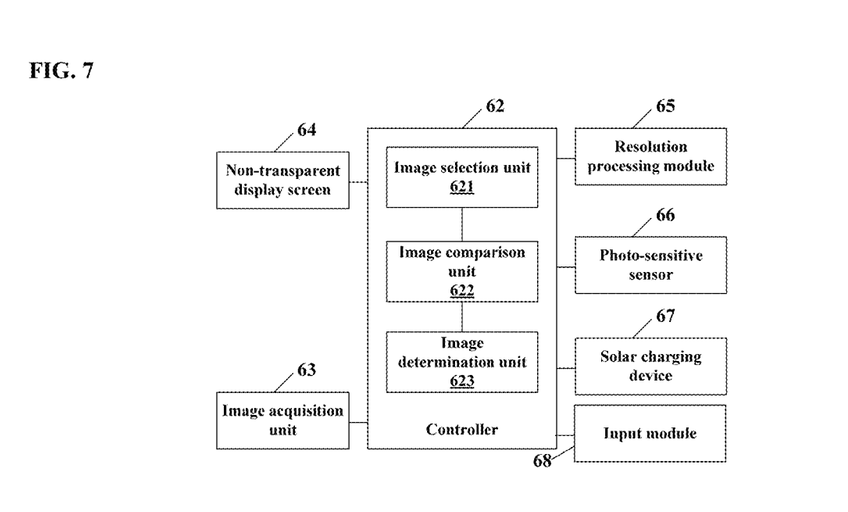
FIG. 7 is a block diagram illustrating an exemplary vehicle display device according to disclosed embodiments.

In a third embodiment, FIG. 6 is a diagram illustrating a vehicle display device. FIG. 7 is another diagram illustrating the vehicle display device. As shown in FIG. 6 and FIG. 7, a vehicle display device may include a controller 62 and a non-transparent display screen 64. The controller 62 may be used to receive images, and label reference objects in the images. The first image to be displayed may be determined from a plurality of surrounding images according to the reference object and the real object corresponding to the reference object. The non-transparent display screen 64 may be used to display the first image in the driver's sightline, and the non-transparent display screen 64 may be electrically connected to the controller 62. Optionally, the non-transparent display screen 64 may be a frameless display screen, and the use of the frameless display screen may prevent occurrence or expansion of a displaying blind spot. The non-transparent display screen 64 may be integrated onto a windshield glass, or may be fixed inside the vehicle cabin using other methods.

Optionally, the controller 62 may include an image selection unit 621, an image comparison unit 622, and an image determination unit 623. The image selection unit 621 may be used to acquire the second image containing the reference object from the surrounding images. The image comparison unit 622 may be used to compare the compatibility of the physical spaces between the reference object and the real object corresponding to the reference object. The image determination unit 623 may be used to determine the second image as the first image when the physical spaces between the reference object and the real object corresponding to the reference object are compatible.

The controller 62 may label the reference object in the surrounding image of the vehicle surroundings collected by an image acquisition module 63. The first image to be displayed may be determined from a plurality of surrounding images according to the reference object and the real object corresponding to the reference object. The first image may be displayed on the non-transparent display screen 64 in the driver's sightline, and the compatibility between the display content and the surrounding environment may be ensured via the labeled reference object, and the driver may obtain related information of the vehicle surroundings via the first image displayed on the display screen, thus alleviating/improving the driving safety issue when the driver's view is partially blocked.

Optionally, the vehicle display device may also include the image acquisition module 63. The image acquisition module 63 may be electrically connected to the controller 62 to obtain surrounding images of a vehicle.

Optionally, the vehicle display device may also include a holder 61 installed inside the vehicle cabin, and the non-transparent display screen 64 may be installed on the holder 61. Optionally, the holder 61 may be the holder for a sun visor.

Optionally, the image acquisition module 63 may be one or a plurality of cameras. The camera or the plurality of cameras may be installed outside the vehicle body.

Optionally, the image acquisition module 63 may be one or a plurality of cameras. The camera or the plurality of cameras may be installed on the holder 61. A shooting direction of the one or the plurality of cameras may be the same as the driving direction of the vehicle.

The image acquisition module 63 may be installed on a camera of the vehicle. For example, the image acquisition module 63 may be installed on the holder 61, or on the front bumper of the vehicle. The image acquisition module 63 may also be a camera on the smart phone. The camera in the smart phone may be used to take surrounding images of the vehicle, and the surrounding images of the vehicle may be delivered to the controller 62 by method of wired or wireless transmission. The types of the image acquisition module 63 is for illustrative purposes only, and is not intended to limit the scope of the present disclosure.

Further referring to FIG. 7, the vehicle display device may also include a resolution processing module 65 that is electrically connected to the controller 62. The resolution processing module 65 may be used to perform real-time image processing of the surrounding image based on the enhancement algorithm, thus obtaining the adjusted surrounding images.

A user may select the adjustment algorithm of image resolution, and may input a control command into the vehicle display device via an input module. Different control commands may correspond to different image resolution processing modes, including an image resolution processing mode for a foggy day, an image resolution processing mode for a rainy day, an image resolution processing mode for a snowy day, and an image resolution processing mode for glare control.

The surrounding image may be adjusted using an existing image resolution adjustment algorithm. The existing image resolution adjustment algorithm may include but not limited to algorithms that adjust the image color, the image resolution, the image contrast, and the image brightness. Other methods may also be used for image adjustment. For example, the collected surrounding image may be compared to a standard image, and the resolution of the surrounding image may be adjusted according to the standard image. The standard image may be a rainy day image, a foggy day image, etc. The disclosed adjustment algorithm of image resolution is for illustrative purposes only, and is not intended to limit the scope of the present disclosure.

Further referring to FIG. 6 and FIG. 7, the vehicle display device may also include a photo-sensitive sensor 66. The photo-sensitive sensor 66 may be electrically connected to the controller 62. The controller 62 may automatically adjust the display brightness of the non-transparent display screen 64 according to the ambient light intensity collected by the photo-sensitive sensor 66. Optionally, the photo-sensitive sensor 66 may be installed on the holder 61.

Further referring to FIG. 6 and FIG. 7, the vehicle display device may also include a solar charging device 67. The solar charging device 67 may be electrically connected to the controller 62. Optionally, the solar charging device 67 may be installed on the holder 61.

Further referring to FIG. 6, the vehicle display device may also include one or a plurality of input modules 68 used to input control commands. The input module 68 may be electrically connected to the controller 62. Optionally, the input module 68 may be installed on the holder 61, or the input module 68 may be a button. Different control commands may correspond to different image resolution processing modes, including the image resolution processing mode for a foggy day, the image resolution processing mode for a rainy day, the image resolution processing mode for a snowy day, and the image resolution processing mode for glare control. The control commands are for illustrative purposes only, and are not intended to limit the scope of the present disclosure.

In this embodiment, the reference object may be labeled in the images collected in the vehicle surroundings. The first image to be displayed may be determined from a plurality of surrounding images according to the reference object and the real object corresponding to the reference object. The first image may be later displayed on the non-transparent display screen 64 in the driver's sightline. The compatibility between the display content and the surrounding environment may be ensured via checking the labeled reference object, and the driver may obtain related information of the vehicle surroundings via the first image displayed on the display screen, thus improving driving safety when the driver's view is partially blocked by a visor.

Further, under undesirable weather conditions, the resolution of the collected surrounding image of the vehicle may be adjusted. Accordingly, even under conditions of windy and rainy, snowy, or foggy conditions, the driver may still see clear images through the display screen, thus improving the viewing quality of the driver caused by the weather to further improving the driving safety.

In one embodiment, the sun visor may include a sun visor frame and the disclosed vehicle display device. The non-transparent display screen 64 of the vehicle display device may be installed on the sun visor frame, and the sun visor frame may be installed above the driver's seat via a supporting shaft.

One embodiment of the present disclosure provides a vehicle with display systems. The disclosed vehicle may include a vehicle display device or a sun visor. A reference object may be labeled in the surrounding images of the vehicle. The first image to be displayed may be determined from a plurality of surrounding images according to the reference object and the real object corresponding to the reference object. The non-transparent display screen 64 may display the first image in the driver's sightline. The compatibility between the display content and the surrounding environment may be ensured via checking the labeled reference object, and the driver may obtain related information of the vehicle surroundings via the first images displayed on the display screen, thus alleviating the driving safety issue when the driver's view is blocked.

Further, the brightness level, contrast, color, and resolution of the collected surrounding image of the vehicle may be adjusted accordingly to various display modes. Accordingly, even under windy and rainy, snowy, or foggy conditions, the driver may still see clear images through the display screen, thus improving view quality of the and driving safety.

Figure 8:
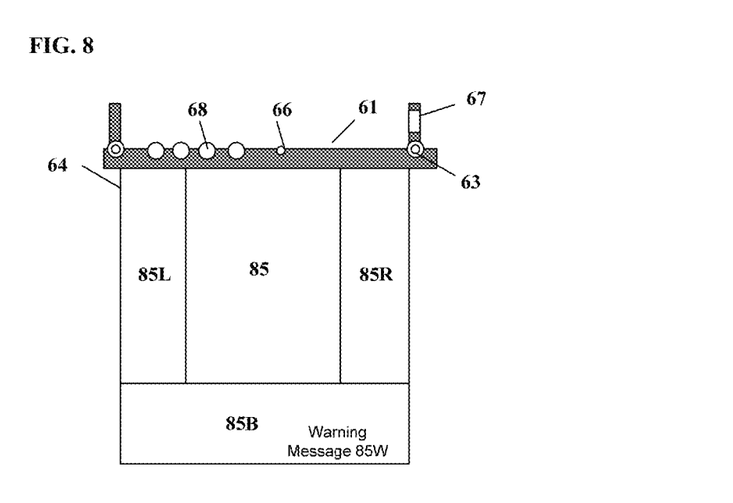
FIG. 8 is another block diagram illustrating an exemplary vehicle display device according to disclosed embodiments.
Figure 9:
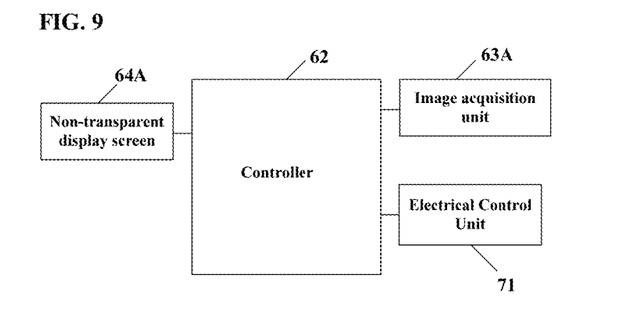
FIG. 9 is another diagram illustrating an exemplary vehicle display device according to disclosed embodiments.

In another embodiment, a vehicle display device consistent with the present disclosure may display multiple images on a non-transparent display screen. FIG. 8 is a diagram illustrating an exemplary display of the vehicle display device. FIG. 9 illustrates an exemplary vehicle display system.

As shown in FIG. 8 and FIG. 9, a vehicle display device may include a controller 62 and a non-transparent display screens 64A. The controller 62 may be used to receive images, and label reference objects in the images. The image to be displayed may be determined from a plurality of surrounding images according to the reference object and the real object corresponding to the reference object. The controller 62 may be connected to a vehicle electronic control unit 71 (ECU). The vehicle ECU 71 may include a navigation unit, a powertrain control unit, a user interface control unit, or any embedded unit that controls one or more of the electrical system or subsystems in a vehicle.

In one embodiment, two of the non-transparent display screens 64A may be connected to the controller 62. The non-transparent display screen 64A may be used to display one or more images in front of the driver. In one example, the vehicle may have a plurality of image acquisition modules, such as image acquisition modules 63A and 63B embedded with a front camera, two side view cameras, and a rear view camera. The image data from the side cameras and rear camera may be routed to the non-transparent display screen 64A through ECU 71 and controller 62. In FIG. 8, for example, the non-transparent display 64A may display one image 85R showing image from the right side camera; one image 85 showing the image from a front view camera; one image 85L showing image from the left side camera; and one image 85B showing image from the rear view camera.

In one embodiment, the non-transparent display screen 64A may also display warning messages on top of the image. For example, various control units of ECU 71 may send warning messages to be displayed to controller 62. The controller 62 may determine to display a warning message, such as warning message 85W in FIG. 9, on the non-transparent display screen 64A. For example, the warning message 85W may be a warning message of bad road condition, which may be generated by the vehicle's navigation system.

In one embodiment, the non-transparent display screen 64A may be larger than the size of a conventional driver side sun visor. For example, the non-transparent display screen 64A may be the size of about a quarter of the wind shield screen, e.g., 20 inches by 20 inches. In some embodiments, working vehicles that are designed for specific uses, such as operating in a work environment with strong glares or long darkness hours, may benefit from having an oversized non-transparent display screen 64A that may better block strong light from outside the vehicle cabin and provide improved image quality. Further, with a larger non-transparent display screen 64A, it would be easy for a driver to monitor multiple images around the vehicle, as illustrated in FIG. 9.

Figure 10:
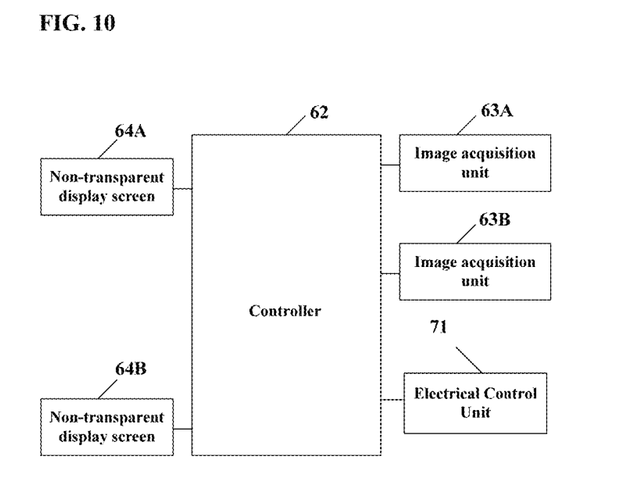
FIG. 10 is another diagram illustrating an exemplary vehicle display device according to disclosed embodiments.

Referring to FIG. 10, in addition to the components shown in FIG. 9, the controller 62 may connect to more than one non-transparent display screens 64A and 64B. Non-transparent display screens 64A and 64B may display images collected from image acquisition modules 63A and 63B. For example, the non-transparent display screen 64A may be a part of a driver side visor and non-transparent display screens 64B may be a part of a passenger side sun visor. Further, image acquisition modules 63A and 63B may include image acquisition modules that are embedded with cameras that are both forward facing and backward facing. A driver may then view images looking out of the wind shield on non-transparent display screen 64A. A passenger may then view images streamed from controller 62 on non-transparent display screen 64B. A passenger may also use the non-transparent display screen 64B as a mirror by switching a camera direction to face the passenger and display the image from the passenger facing camera.

In one embodiment, because the controller 62 is connected to the ECU 71 that may include the vehicle entertainment system, the passenger may view a video stream on the non-transparent display screen 64B. The controller 62 may display one or more images on non-transparent display screen 64A or 64B, as described in relation to FIG. 8. In one example, controller 62 may display a warning message 85W, such as a warning message for bad road conditions, on one or both of the non-transparent display screen 64A and 64B. The warning message 85W may be a line of text, graphic warning signs or symbols, or a combination of text and warning signs or symbols.

In one embodiment, non-transparent display screen 64A or 64B may display different images with the same warning message. For example, non-transparent display screen 64A may display images collected from image acquisition module 63A; non-transparent display screen 64B may display images collected from image acquisition module 63B; and non-transparent display screen 64A or 64B may both display a same warning message. In another example, non-transparent display screen 64A may display images collected from image acquisition module 63A and received from controller 62, such as images from sider view cameras; non-transparent display screen 64B may display images received from controller 62, such as a video stream from the vehicle entertainment unit; and non-transparent display screen 64A or 64B may both display a same warning message. In some embodiments, controller 62 may determine that non-transparent display screen 64A or 64B would display different warning messages.

The non-transparent display screens 64A and 64B may be a frameless display screen, and the use of the frameless display screen may prevent occurrence or enlargement of a displaying blind spot. The non-transparent display screen 64A and 64B may be integrated onto a windshield glass, or may be fixed inside the vehicle cabin using other support structures.

It should be noted that "one embodiment" means certain characteristics, structures, or properties related to the embodiment are included in at least one embodiment. As a result, "in one embodiment" may not refer to the same embodiment. In addition, certain characteristics, structure or properties may be integrated in one or a plurality of embodiments in a flexible but appropriate way.

In various embodiments, the values of the sequence number may not mean an execution order of commands. The execution order of each process may be determined based on functions and inherent logic, and may not be used to restrict the execution process.

The disclosed method and device may also be realized using other approaches. For example, the division of the disclosed unit may merely be a logic function division. In real operation, other division methods may be available. For example, a plurality of units or modules may be combined or integrated into one system, some characteristics may be neglected or left without execution. The disclosed mutual coupling, direct coupling or communication connection may be realized via some ports. The indirect coupling or communication connection between devices or units may be electrical, mechanical or in other forms.

In addition, various functional units may be integrated into one processing unit, or in separate units. Two or more units may be integrated in one unit. The integrated unit may be realized using hardware, or a combination of hardware and software functional units.

A module or the integrated unit realized using the software programs may be stored in a storage medium readable by a computer. The software programs may be stored in a storage medium, and a plurality of commands may be applied to make a computer device (personal PC, server, or network device) to execute partial procedure of the sending and receiving methods. The disclosed storage medium may include various media to store programming codes like flash drivers, hard disks, Read-Only Memory (ROM), Random Access Memory (RAM), discs, or CDs.

What is claimed is:

1. A vehicle display device, configured to be mounted on a sun visor frame, comprising:
    a controller for receiving surrounding images, labeling a reference object in the surrounding images, and determining a first image to be displayed from the surrounding images according to a comparison of the reference object and a real object corresponding to the reference object;
    a non-transparent display screen for displaying the first image in a driver's sightline, wherein the non-transparent display screen is connected to the controller;
    an enhancement module connected to the controller, wherein the enhancement module is configured to adjust the surrounding images based on an enhancement algorithm to obtain adjusted surrounding images;
    wherein the controller comprises:
    an image selection unit configured to obtain a second image containing the reference object from the surrounding images;
    an image comparison unit configured to compare the physical spaces between the reference object and a real object corresponding to the reference object;
    an image determination unit configured to identify the second image as the first image to be displayed when the physical spaces between the reference object and the real object corresponding to the reference object are compatible; and
    a photo-sensitive sensor connected to the controller, wherein the photo-sensitive sensor is configured to detect an ambient light intensity, and the controller adjusts a display brightness of the non-transparent display screen based on the ambient light intensity.

2. The vehicle display device according to claim 1, further comprising:
    an image acquisition module connected to the controller, wherein the image acquisition module is configured to acquire the surrounding images of the vehicle.

3. The vehicle display device according to claim 2, further comprising:
a holder installed inside a vehicle cabin, wherein the non-transparent display screen is supported by the holder.

4. The vehicle display device according to claim 3, wherein the image acquisition module includes one or a plurality of cameras, and the camera or the plurality of cameras are installed outside the vehicle.

5. The vehicle display device according to claim 3, wherein the image acquisition module includes one or a plurality of cameras, and the camera or the plurality of cameras are installed on the holder.

6. The vehicle display device according to claim 3, wherein a shooting direction of one of the plurality of cameras is the same as a driving direction of the vehicle.

7. The vehicle display device according to claim 1, wherein the controller is connected to an electric control unit (ECU).

8. The vehicle display device according to claim 1, wherein the controller is connected to a vehicle entertainment unit.

9. The vehicle display device according to claim 1, further comprising:
a solar charging module connected to the controller.

10. The vehicle display device according to claim 1, wherein the non-transparent display screen is frameless.

11. An image display method for displaying an image of a surrounding environment of a vehicle, comprising:
acquiring surrounding images of a vehicle;
labeling a reference object in the surrounding images;
determining a first image to be displayed based on the surrounding images according to a comparison of the labeled reference object and a corresponding real object;
displaying the first image in real-time on a non-transparent display screen in a driver's sightline;
adjusting the surrounding images based on an enhancement algorithm; and obtaining adjusted surrounding images;
acquiring a second image containing the reference object from the surrounding images;
comparing physical spaces of the reference object in the second image and the corresponding real object in the second image;
defining the second image as the first image to be displayed when the physical spaces of the reference object and the real object corresponding to the reference object are compatible;
detecting an ambient light intensity; and
adjusting a display brightness of the non-transparent display screen according to the ambient light intensity.

12. The method according to claim 11, further comprising:
acquiring the surrounding images of the vehicle; and
labeling the reference object in the surrounding images based on a driving direction of the vehicle.

13. The method according to claim 12, further comprising:
acquiring the surrounding images of the vehicle via one or a plurality of cameras, wherein the camera or the plurality of cameras are installed inside the vehicle cabin, or the camera or the plurality of cameras are installed outside the vehicle body.

14. The method according to claim 13, further comprising:
displaying the first image and other surrounding images in real-time in the non-transparent display screen in a driver's sightline.

15. The method according to claim 11, further comprising:
receiving and displaying a warning message on the non-transparent display screen together with the first image.

16. The method according to claim 11, further comprising:
acquiring and displaying a surrounding image reflecting a right-side view from the vehicle on the non-transparent display screen together with the first image; a surrounding image reflecting a left-side view from the vehicle on the non-transparent display screen together with the first image; and a surrounding image reflecting a rear view from the vehicle on the non-transparent display screen together with the first image.

17. A vehicle sun visor, comprising a sun visor frame, a vehicle display device according to claim 1, the non-transparent display screen of the vehicle display device being installed on the sun visor.

18. A vehicle, comprising one or more of the vehicle display devices according to claim 1.

19. A vehicle, comprising the vehicle sun visor according to claim 17.

* * * * *